United States Patent

Clifford et al.

Patent Number: 5,200,369
Date of Patent: Apr. 6, 1993

[54] GLAZE COMPOSITIONS

[75] Inventors: John F. Clifford, Sydenham; Ivan Wozniak, Longton, both of United Kingdom

[73] Assignee: Cookson Group PLC, London, United Kingdom

[21] Appl. No.: 682,381

[22] Filed: Apr. 9, 1991

[30] Foreign Application Priority Data

Apr. 12, 1990 [GB] United Kingdom ............. 9008386

[51] Int. Cl.$^5$ .............................................. C03C 3/091
[52] U.S. Cl. ..................................... 501/66; 501/21; 501/59; 501/67; 501/77; 501/78; 501/79
[58] Field of Search ............ 501/21, 55, 59, 66, 501/67, 77, 78, 79

[56] References Cited

U.S. PATENT DOCUMENTS

| | | | |
|---|---|---|---|
| 3,428,466 | 2/1969 | Wolf | 501/21 |
| 4,282,035 | 8/1981 | Nigrin | 501/32 |
| 4,554,258 | 11/1985 | Francel | 501/21 |
| 4,961,999 | 10/1990 | Hormadaly | 501/77 |

*Primary Examiner*—Karl Group
*Attorney, Agent, or Firm*—Watson, Cole, Grindle & Watson

[57] ABSTRACT

Glaze composition for use on bone china and fine china which is essentially free from lead and cadium comprises, by weight, $SiO_2$:35 to 60%, $Bi_2O_3$:5 to 45%, $Al_2O_3$:5 to 20%, $B_2O_3$:1 to 15%, at least one of CaO, MgO, SrO or BaO:2 to 20%, at least one of $Li_2O$, $Na_2O$, $K_2O$:1 to 10%, and certain other optional ingredients, with the proviso that BaO is not contained in an amount of more than 2% by weight.

5 Claims, No Drawings

GLAZE COMPOSITIONS

BACKGROUND AND SUMMARY OF THE INVENTION

The present invention relates to glazes which are of minimal toxicity and substantially free of lead, cadmium, arsenic, barium and antimony.

For several reasons the development of lead-free glazes with the appropriate properties to match the properties of the ceramic ware to which they are to be applied is a very desirable commercial goal. First, occasional episodes of lead poisoning have resulted from the use of improperly formulated and fired lead-containing glazes on ceramic ware. Whilst lead-containing glazes can be prepared which are safe and meet current requirements for permissible lead release to food with which they come into contact, the problem of lead poisoning is avoided if lead is avoided. In addition, various pollution controls regarding the use of lead and limits on the content of lead in waste water can be avoided by the use of lead-free glazes.

In the ceramic art a glaze is typically defined as a transparent or opaque glassy coating fired onto a ceramic article or a mixture of ingredients from which the coating is made. Glazes are of two main types, "raw" or "fritted".

"Raw" glazes are typically composed of a mixture of finely ground insoluble beneficiated natural materials—minerals and rocks such as china clay and nepheline syenite. Raw glazes are typically used at high firing temperatures (>1150° C.) on substrates such as porcelain (1300° C.).

"Fritted" glazes are those where all or part of the ingredients have been prefused and quenched to form one or more frits. The frits are ground and mixed with other constituents (natural materials such as china clay) to formulate the final glaze composition.

Fritting is usually carried out, amongst other reasons, in order to improve homogeneity and to render water soluble or toxic constituents insoluble. Fritted glazes are usually used for ceramic ware fired below 1150° C.

The compositions herein described apply to the final composition of the glaze coating, the consitutuents from which they are formed being partly a matter of availability, economics and choice. It is envisaged that the glaze formulations of the present invention will be utilised as fritted glazes but this is not obligatory.

The composition of the glaze is chosen to ensure certain well defined properties such as adhesion to the substrate, a thermal expansion which matches that of the substrate, transparency or opacity, surface finish and texture, and resistance to chemical attack.

Ceramic ware falls into various different categories and it is generally considered that one of the finest types of ceramic ware is bone china which is produced almost exclusively in the United Kingdom. Bone china is the general term which is used to describe vitreous, translucent pottery made from a body of the following approximate composition (percent); calcined bone, 45-50; china clay, 25-30; china stone 25-30.

Bone china is highly prized partly because of the characteristic very high gloss transparent glaze applied to it, which previously has only been achieved by incorporating relatively large quanities of lead into the glaze. There is thus a great need for a lead-free glaze suitable for application to bone china, and fine china.

Various lead-free glazes have been described in the art and specific mention may be made of the following prior art.

U.S. Pat. No. 4,285,731 discloses frit compositions which are substantially free of lead and cadmium, the frits consisting essentially, in weight percent on the oxide basis, of:

| | |
|---|---|
| $SiO_2$ | 35 to 47 |
| $B_2O_3$ | 5.5 to 9 |
| BaO | 24 to 42 |
| $TiO_2$ | 1.5 to 4 |
| $ZrO_2$ | 6 to 10 |
| $Li_2O$ | 1 to 5 |
| SrO | 0 to 8 |
| MgO | 0 to 5 |
| CaO | 0 to 5 |
| ZnO | 1 to 10 |
| $Bi_2O_3$ | 0 to 8 |
| $SrO + MgO + CaO + ZnO + Bi_2O_3$ | 0 to 10 |

The above frits exhibited a coefficient of thermal expansion between about 65 to $75 \times 10^{-7}/°C.$, a viscosity suitable for firing at about 700° to 950° C., and excellent resistance to attack by acids and bases.

U.S. Pat. No. 4,282,035 also describes lead and cadmium-free frits, those frits exhibiting coefficients of thermal expansion between about 52 to $65 \times 10^{-7}/°C.$, maturing temperatures of about 850° to 1100° C., excellent resistance to attack by acids and alkalis, and consisting essentially, in weight on the oxide basis, of:

| | |
|---|---|
| $SiO_2$ | 51 to 60 |
| $B_2O_3$ | 4.5 to 8 |
| BaO | 0 to 13 |
| SrO | 0 to 18 |
| BaO + SrO | 6 to 30 |
| $ZrO_2$ | 4 to 8 |
| $Al_2O_3$ | 5 to 8 |
| $Li_2O$ | 0 to 4 |
| $Na_2O$ | 0 to 5 |
| $K_2O$ | 0 to 5 |
| $Li_2O + Na_2O + K_2O$ | 1 to 5 |
| MgO | 0 to 6 |
| CaO | 0 to 12 |
| $Bi_2O_3$ | 0 to 10 |
| $MgO + CaO + Bi_2O_3$ | 0 to 20 |

U.S. Pat. No. 4,354,258 describes lead, cadmium and arsenic-free glass frit compositions which consist essentially of $Bi_2O_3$, $B_2O_3$, $SiO_2$ with $R_2O$ being 2 to 8% and RO being 0 to 9% by weight.

U.S. Pat. No. 4,590,171 also describes lead and cadmium-free frits consisting essentially, in weight percent on the oxide basis, of

| | |
|---|---|
| $Li_2O$ | 3 to 4 |
| $Na_2O$ | 0.75 to 3 |
| BaO | 3.5 to 9.5 |
| $B_2O_3$ | 14 to 17.5 |
| $Al_2O_3$ | 6.75 to 8.75 |
| $SiO_2$ | 48 to 55 |
| $ZrO_2$ | 6.75 to 10.5 |
| F | 3 to 4 |

Finally, U.S. Pat. No. 4,892,847 discloses lead-free glass frit compositions consisting essentially of $SiO_2$, $Bi_2O_3$, $B_2O_3$, alkali metal oxide and $ZrO_2/TiO_2$ in appropriate concentrations.

There are four essential criteria which must be demonstrated by glazes, and a fifth characteristic which is essential when a high gloss glaze is required, as in this instance.

First, the firing or glazing temperature of the glaze must not exceed the temperature at which the ceramic body being coated thermally deforms.

Second, the coefficient of thermal expansion of the glaze must be compatible with that of the ceramic body being coated to preclude crazing and/or spalling; the glaze preferably having coefficients of thermal expansion somewhat lower than that of the substrate such that, when the ceramic body is cooled the fired coating will form a surface compression layer.

Third, the glaze must possess excellent resistance to attack by acids and bases since corrosion of the coating can result in the loss of gloss, the development of haze and/or iridescence, the formation of porosity, or other defects deleterious to the appearance or physical character of the coating.

Fourth, in the case of transparent glazes, the glaze must maintain good glass stability and must not devitrify to any substantial extent during the firing.

Fifth, where a glossy appearance is desired, the refractive index of the glaze must be high.

Although certain of the lead-free frits of the prior art fulfill at least some of the criteria listed above, heretofore there has not been a lead-free glaze proposed which has the appropriate combination of characteristics which make it suitable for use on bone and fine china which require very high quality glazes with a very high refractive index so as to provide the characteristic high gloss finish to the glazed ceramic article. It is this latter parameter, combined with the standard mechanical and chemical resistance requirement of a glaze, which has eluded previous attempts at a lead free glaze for bone china and fine china.

Furthermore, bone and fine china are fired at relatively high temperatures of from 1060° C. to 1140° C. and a glaze is required with a glazing temperature which will match the firing temperature of the bone and fine china body.

We have now developed a lead-free glaze composition which can be applied to bone china and fine china with excellent results.

Accordingly, the present invention provides a glaze composition for use on bone china and fine china which is essentially free from lead and cadmium and which comprise the following components:

| | |
|---|---|
| $SiO_2$ | 35 to 60% |
| $Bi_2O_3$ | 5 to 45% |
| $Al_2O_3$ | 5 to 20% |
| $B_2O_3$ | 1 to 15% |
| at least one of $CaO, MgO, SrO$ or $BaO$ | 2 to 20% |
| at least one of $Li_2O, Na_2O, K_2O$ | 1 to 10% |
| $TiO_2$ | 0 to 10% |
| $ZrO_2$ | 0 to 10% |
| $SnO$ | 0 to 10% |
| $Nb_2O_5$ | 0 to 5% |
| $Ta_2O_5$ | 0 to 5% |
| $Sb_2O_3$ | 0 to 5% |
| a rare earth oxide | 0 to 10% |
| $ZnO$ | 0 to 10% |
| $P_2O_5$ | 0 to 10% |
| $MoO_3$ and/or $WO_3$ | 0 to 5% |
| fluoride ions | 0 to 5% | all percentages being percentages by weight based on the total weight of the composition, with the proviso that BaO is not contained in an amount of more than 2% by weight, the glaze composition having a firing temperature of 1100° C.±40° C., and having a coefficient of thermal expansion of 50 to $90 \times 10^{-7}$° $C.^{-1}$.

The glaze compositions of the present invention preferably comprise from 10 to 25% by weight of $Bi_2O_3$, from 45 to 60% by weight of $SiO_2$, from 7 to 15% by Weight of $Al_2O_3$, from 4 to 10% by weight of $B_2O_3$, and from 0 to 2.5% by weight of $ZrO_2$.

In order to be suitable for glazing bone china or fine china the glaze of the present invention should fire at a temperature in the range of from 1060° to 1140° C. and should preferably have a refractive index of at least 1.45.

The glass frits which may be used to form the glazes of the present invention can be prepared by mixing together the oxide producing materials, charging the mixture of materials into a glass melting furnace at a temperature sufficiently high to produce the fused glass and then fritting the glass by pouring it into water, or by passing it through water cooled rolls. It may be preferred to carry out the fritting operation in an oxidizing atmosphere, or to include an oxygen-rich component in the mixture which is melted and fused. The frit may be ground into a powder by conventional grinding techniques.

Though methods exist for applying glazes in dry or even molten form, the conventional method of application for bone china is in the form of a fine ground water-based slurry or slip with the item being coated by either dipping or spraying. This glaze slip might consist, in addition to the carrier medium-water, exclusively of a single ground frit, or a mixture of many materials including frits, minerals, insoluble manufactured chemicals as well as minor quantities of rheological modifying agents. These latter constituents may include such things as flocculants, deflocculants, binders, wetting agents, antifoaming agents and for identification purposes, even organic dyes. The glaze may optionally contain one or more pigments.

The mode of application of the glaze to the ceramic article is not seen as central to this invention, any feasible method is permissible.

The precise blend and form of the constituents from which the final glaze is formed may be changed without substantially departing from the invention intended to be defined herein. The description being merely illustrative of embodiments of the principle of the invention and not limiting it.

The glazes of the present invention have a glazing or glost temperature in the range of from 1060° to 1140° C. in order to make them suitable for use with bone china. By the term "glazing temperature" as used herein is meant a temperature at which the glaze melts and flows sufficiently to produce a smooth uniform homogenous coating on the ceramic body being coated therewith. The glazing temperature is also sometimes referred to as the firing or glost temperature.

The glazes of the present invention comprise at least one of CaO, MgO, SrO or BaO in an amount of from 2 to 20% by weight, in total. Mixtures of these oxides may advantageously be used. However, because of its toxicity the BaO content in the glazes of the present invention is kept below 2% by weight and preferably is zero. The glazes of the present invention also comprise at least one of $Li_2O, Na_2O$ or $K_2O$ in an amount of from 1 to 10% by weight, in total.

Whilst the glazes of the present invention may incorporate antimony oxide, like barium oxide its use is not thought desirable and addition levels should be kept below 5% and preferably zero.

The glazes of the present invention may also comprise the various optional ingredients listed above. Moderate additions of $ZrO_2$ and/or $TiO_2$ are beneficial since $ZrO_2$ will improve the resistance of the glaze to alkali and detergent solution attack, whilst the addition of $TiO_2$ will improve the resistance of the glass to acid attack. Additions of high valency elements (e.g. $Zr^{4+}$, $Ti^{4+}$, $Nb^{5+}$) tend to promote crystallization. Hence significant levels of additions of these elements tend to yield opaque or partially opacified glazes which may be desirable in certain instances. When ZnO is used in the glazes of the present invention, the amount is preferably used in an amount of below 2% by weight. When $WO_3$ is used in the glazes of the present invention it is preferably used in an amount of less than 3% by weight. When $MoO_3$ is used in the glazes of the present invention it is preferably used in amounts of less than 2% by weight, more preferably less than 1% by weight, as amounts above 2% will tend to render the glazes opaque.

The preferred rare earth oxide for inclusion in the glazes of the present invention is lanthanum oxide.

The present invention also includes within its scope a method of glazing a ceramic body, which method comprises coating a ceramic body with a glaze composition as hereinbefore described and firing the coated ceramic body at a temperature of 1100° C.±40° C. Preferably the ceramic body coated according to the method of the invention is bone china.

The present invention will be further described with reference to the following Examples.

EXAMPLE 1

A glass frit having the following composition was prepared.

| Components | % by weight |
| --- | --- |
| $SiO_2$ | 39.92 |
| $Al_2O_3$ | 7.37 |
| CaO | 5.07 |
| MgO | 0.13 |
| $K_2O$ | 0.52 |
| $Na_2O$ | 3.89 |
| $B_2O_3$ | 6.28 |
| $Li_2O$ | 0.50 |
| $Bi_2O_3$ | 36.32 |

The frit was quenched and ground to produce a fine powder.

A glaze slip was produced by mixing the frit in water, with the aid of a ball mill, with a second lead free frit, china clay, sodium feldspar, ball clay and bentonite in suitable proportions to produce a glaze with the following final composition.

| Components | % by weight |
| --- | --- |
| $SiO_2$ | 43.76 |
| $Al_2O_3$ | 9.62 |
| CaO | 6.69 |
| MgO | 0.08 |
| $K_2O$ | 1.02 |
| $Na_2O$ | 5.48 |
| $B_2O_3$ | 9.62 |
| $Li_2O$ | 0.32 |
| $Bi_2O_3$ | 23.78 |

On coating onto a bone china substrate and firing to a temperature of 1060° C., an even glaze with a very high gloss was produced.

The glaze had a thermal expansion of $78.9 \times 10^{-7}$ °C.$^{-1}$ and a softening temperature of 625° C. The glaze had a refractive index of $n = 1.575 \pm 0.005$.

EXAMPLE 2

A glass frit having the following composition was prepared.

| Components | % by Weight |
| --- | --- |
| $SiO_2$ | 47.37 |
| $Al_2O_3$ | 6.51 |
| CaO | 9.79 |
| $K_2O$ | 1.43 |
| $Na_2O$ | 1.27 |
| $B_2O_3$ | 9.34 |
| $Bi_2O_3$ | 24.29 |

The frit was quenched and ground to produce a fine powder.

A glaze slip was produced by dispersing (by ball milling) 86 parts of frit with 14 parts of china clay in water to produce a glaze of the following final composition (by weight).

| | |
| --- | --- |
| $SiO_2$ | 48.17 |
| $Al_2O_3$ | 10.44 |
| CaO | 8.74 |
| $K_2O$ | 1.49 |
| $Na_2O$ | 1.13 |
| $B_2O_3$ | 8.34 |
| $Bi_2O_3$ | 21.69 |

On coating onto both a bone china and fine china substrate and firing at a temperature of 1080° C., an even glaze with a very high gloss was produced in both cases.

The glaze had a thermal expansion of $63.7 \times 10^{-7}$ °C.$^{-1}$ and a softening temperature of 628° C.

The glaze had a refractive index of $n = 1.570 \pm 0.005$.

EXAMPLE 3

A glass melt of the following composition was produced:

| Component | % by weight |
| --- | --- |
| $Bi_2O_3$ | 75.14 |
| $SiO_2$ | 19.38 |
| $Al_2O_3$ | 5.48 |

The material was frit quenched and ground to produce a fine powder.

A glaze slip was produced by ball milling together in water 32.27 parts by weight of this frit together with 57.16 parts of two other lithium, sodium, potassium and calcium alumina borosilicate frits plus 10.63 parts china clay. On firing, this glaze slip yielded a glaze as given in Table 1.

The characteristics and properties obtained by firing this glaze slip onto bone china at 1080° C. are also given in Table 1.

EXAMPLE 4

A glass melt of the following composition was produced:

| Component | % by weight |
|---|---|
| Bi$_2$O$_3$ | 75.14 |
| SiO$_2$ | 19.38 |
| Al$_2$O$_3$ | 5.48 |

The material was frit quenched and ground to produce a fine powder.

A glaze slip was made by mixing together the above frit with two further alkali alumina borosilicate frits, soda felspar, china clay, ball clay, bentonite, limestone, alumina, silica, zinc oxide, barytes and gypsum in appropriate amounts by means of ball milling in water to form a glaze slip which on firing yielded a glaze as given in Table 1.

The characteristics and properties obtained by firing this glaze slip onto bone china at 1080° C. are also given in Table 1.

EXAMPLE 5

A glass melt of the following composition was produced.

| Component | % by weight |
|---|---|
| SiO$_2$ | 47.37 |
| Al$_2$O$_3$ | 6.51 |
| CaO | 9.79 |
| K$_2$O | 1.43 |
| Na$_2$O | 1.27 |
| B$_2$O$_3$ | 9.34 |
| Bi$_2$O$_3$ | 24.29 |

The material was frit quenched and ground to produce a fine powder.

A glaze slip was prepared by ball milling together in water:
81.90 parts frit
13.33 parts china clay
4.76 parts Nd$_2$O$_3$ On firing onto bone china at 1080° C., this yielded a glaze with the composition and characteristics given in Table 1.

EXAMPLE 6

A glass melt of the following composition was produced:

| Component | % by weight |
|---|---|
| SiO$_2$ | 47.37 |
| Al$_2$O$_3$ | 6.51 |
| CaO | 9.79 |
| K$_2$O | 1.43 |
| Na$_2$O | 1.27 |
| B$_2$O$_3$ | 9.34 |
| Bi$_2$O$_3$ | 24.29 |

The material was frit quenched and ground to produce a fine powder.

A glaze slip was prepared by ball milling together in water:
68.26 parts frit
11.11 parts china clay
20.63 parts silica On firing onto bone china at 1120° C., this yielded a glaze with the composition and characteristics given in Table 1.

EXAMPLE 7

A glass melt of the following composition was produced:

| Component | % by weight |
|---|---|
| SiO$_2$ | 47.37 |
| Al$_2$O$_3$ | 6.51 |
| CaO | 9.79 |
| K$_2$O | 1.43 |
| Na$_2$O | 1.27 |
| B$_2$O$_3$ | 9.34 |
| Bi$_2$O$_3$ | 24.29 |

The material was frit quenched and ground to produce a fine powder.

A glaze slip was prepared by ball milling together in water:
71.68 parts frit
11.67 parts china clay
16.65 parts SrCO$_3$ On firing onto bone china at 1080° C., this yielded a glaze with the composition and characteristics given in Table 1.

EXAMPLE 8

A glass melt of the following composition was produced

| Component | % by weight |
|---|---|
| SiO$_2$ | 37.07 |
| Al$_2$O$_3$ | 19.54 |
| Na$_2$O | 2.48 |
| Li$_2$O | 2.48 |
| K$_2$O | 7.44 |
| MgO | 2.48 |
| CaO | 3.71 |
| SrO | 9.92 |
| BaO | 2.48 |
| Bi$_2$O$_3$ | 12.39 |

The material was frit quenched and ground to produce a fine powder.

A glaze slip was prepared by ball milling together in water:
75.36 parts frit
10.73 parts china clay
8.91 parts limestone (CaCO$_3$)
5.00 parts ZrO$_2$.

On firing onto bone china at 1080° C., this yielded a glaze with the composition and characteristics given in Table 2.

EXAMPLE 9

A glass melt of the following composition was produced:

| Component | % by weight |
|---|---|
| SiO$_2$ | 47.37 |
| Al$_2$O$_3$ | 6.51 |
| CaO | 9.79 |
| K$_2$O | 1.43 |

| Component | % by weight |
| --- | --- |
| $Na_2O$ | 1.27 |
| $B_2O_3$ | 9.34 |
| $Bi_2O_3$ | 24.29 |

The material was frit quenched and ground to produce a fine powder.

A glaze slip was prepared by ball milling together in water:
81.91 parts frit
13.33 parts china clay
4.76 parts $Ca_3(PO_4)_2$ (Bone Ash)

On firing onto bone china at 1080° C., this yielded a glaze with the composition and characteristics given in Table 1.

Their role is illustrated by means of their effect when added singly to the glaze of Example 2. In practice they can and often will be used at other concentrations and in combination to achieve the optimum result. They are included here in order to illustrate the scope of the invention but not to limit it.

The glazes of Examples 10 to 21 were manufactured by the procedure outlined in Example 2.

First, a glass of appropriate composition was melted at approximately 1300° C., frit quenched, ground to a powder and then mixed with 14% china clay by ball milling in water to produce a glaze slip, which on firing yielded a glaze composition(s) as given in Table 2.

All trials followed the same procedure. After coating the bone china test piece (plate) with the glaze slip and drying, they were fired by heating at 5.9° C./min. to 1100° C., held for 45 minutes and cooled at 5.9° C./min. to room temperature. The appearance of the glazed bone china article is also given in Table 2.

TABLE 1

| Example No. | $SiO_2$ | $Al_2O_3$ | $B_2O_3$ | $Li_2O$ | $Na_2O$ | $K_2O$ | $CaO$ | $Bi_2O_3$ | $BaO$ | $ZnO$ | Others | | |
| --- | --- | --- | --- | --- | --- | --- | --- | --- | --- | --- | --- | --- | --- |
| 3 | 48.61 | 10.46 | 9.1 | 0.59 | 3.01 | 0.09 | 1.42 | 26.72 | | | | | |
| 4 | 52.44 | 9.05 | 4.96 | — | 2.89 | 0.69 | 7.08 | 21.64 | 0.66 | 0.59 | | | |
| 5 | 46.17 | 10.49 | 7.81 | — | 1.07 | 1.19 | 8.19 | 20.32 | — | — | 4.76 $Nd_2O_3$ | | |
| 6 | 59.13 | 8.75 | 6.51 | — | 0.88 | 0.99 | 6.84 | 16.9 | — | — | — | | |
| 7 | 42.52 | 9.66 | 7.19 | — | 0.99 | 1.10 | 7.54 | 18.72 | — | — | SrO 12.28 | | |
| 8 | 35.0 | 20.0 | — | 2.0 | 2.0 | 6.0 | 8.0 | 10.0 | 2.0 | — | SrO 8.0 | MgO 2.0 | $ZrO_2$ 5.0 |
| 9 | 46.17 | 10.49 | 7.81 | — | 1.07 | 1.19 | 10.77 | 20.32 | — | — | $P_2O_5$ 2.18 | | |

| Example No. | Glaze Mix | | | Firing Temp (°C.) 3° C./min-2 hour hold | Fired Appearance | Coefficient of Thermal Expansion 1° C.$^{-1}$ | Tg °C. | Mg °C. |
| --- | --- | --- | --- | --- | --- | --- | --- | --- |
| | % Frit(s) | % Clay | % Others | | | | | |
| 3 | 89.37 | 10.63 | — | 1080 | Fair | $73 \times 10^{-7}$ | 495 | 580 |
| 4 | 60.19 | 4.64 | 35.17 | 1080 | Good | $56 \times 10^{-7}$ | 605 | 665 |
| 5 | 81.90 | 13.33 | 4.76 | 1080 | Good | $63 \times 10^{-7}$ | 595 | 665 |
| 6 | 68.25 | 11.11 | 20.63 | 1120 | Good | $52 \times 10^{-7}$ | 610 | 710 |
| 7 | 71.68 | 11.67 | 16.65 | 1080 | Good | $65 \times 10^{-7}$ | 610 | 685 |
| 8 | 75.36 | 10.73 | 13.91 | 1080 | Good Vellum | $83 \times 10^{-6}$ | — | — |
| 9 | 81.90 | 13.33 | 4.76 | 1080 | Poor | $67 \times 10^{-7}$ | 560 | 650 |

EXAMPLES 10 TO 21

The use of optional constitutents to modify and fine tune glaze formulations to meet a specific requirement is demonstrated in Examples 10 to 21.

TABLE 2

| Component | 10 | 11 | 12 | 13 | 14 | 15 | 16 | 17 | 18 | 19 | 20 | 21 |
| --- | --- | --- | --- | --- | --- | --- | --- | --- | --- | --- | --- | --- |
| $SiO_2$ | 46.98 | 46.98 | 47.69 | 47.69 | 47.69 | 45.78 | 46.98 | 46.98 | 47.69 | 46.98 | 46.98 | 45.78 |
| $Al_2O_3$ | 10.18 | 10.18 | 10.34 | 10.34 | 10.34 | 9.92 | 10.18 | 10.18 | 10.34 | 10.18 | 10.18 | 9.92 |
| $CaO$ | 8.52 | 8.52 | 8.65 | 8.65 | 8.65 | 8.31 | 8.52 | 8.52 | 8.65 | 8.52 | 8.52 | 8.31 |
| $K_2O$ | 1.45 | 1.45 | 1.48 | 1.48 | 1.48 | 1.42 | 1.45 | 1.45 | 1.48 | 1.45 | 1.45 | 1.42 |
| $Na_2O$ | 1.10 | 1.10 | 1.12 | 1.12 | 1.12 | 1.07 | 1.10 | 1.10 | 1.12 | 1.10 | 1.10 | 1.07 |
| $B_2O_3$ | 8.13 | 8.13 | 8.26 | 8.26 | 8.26 | 7.92 | 8.13 | 8.13 | 8.26 | 8.13 | 8.13 | 7.92 |
| $Bi_2O_3$ | 21.16 | 21.16 | 21.47 | 21.47 | 21.47 | 20.66 | 21.16 | 21.16 | 21.47 | 21.16 | 21.16 | 20.61 |
| $Ta_2O_5$ | 2.48 | | | | | | | | | | | |
| SnO | | 2.48 | | | | | | | | | | |
| $SnO_2$ | | | 0.99 | | | | | | | | | |
| $Nb_2O_5$ | | | | 0.99 | | | | | | | | |
| $Sb_2O_3$ | | | | | 0.99 | | | | | | | |
| CaF | | | | | | 4.97 | | | | | | |
| $La_2O_3$ | | | | | | | 2.48 | | | | | |
| $WO_3$ | | | | | | | | 2.48 | | | | |
| $MoO_3$ | | | | | | | | | 0.99 | | | |
| $TiO_2$ | | | | | | | | | | 2.48 | | |
| $ZrO_2$ | | | | | | | | | | | 2.48 | |
| SrO | | | | | | | | | | | | 4.97 |
| Firing Temp (°C.) | 1100 | 1100 | 1100 | 1100 | 1100 | 1100 | 1100 | 1100 | 1100 | 1100 | 1100 | 1100 |
| Appearance | G | G/O | M | M | G/P | G | G/O | G | G | G/P | G/O | G |
| T.E.C. ($\times 10^{-6}$/°C.$^{-1}$) | 7.21 | 6.11 | 6.28 | 6.00 | 6.17 | 7.00 | 6.87 | 7.16 | 6.22 | 6.06 | 5.89 | 6.50 |
| Softening | 625 | 663 | 675 | 655 | 700 | 635 | 635 | 612 | 660 | 660 | 650 | 685 |

TABLE 2-continued

| Component | 10 | 11 | 12 | 13 | 14 | 15 | 16 | 17 | 18 | 19 | 20 | 21 |
|---|---|---|---|---|---|---|---|---|---|---|---|---|
| Temp. (°C.) | | | | | | | | | | | | |

G = good, glossy
O = opacified
M = matt
P = pale yellow

We claim:

1. A transparent glaze composition for use on china and fine china which is essentially free from lead and cadmium and which consists essentially of the following components:

| | |
|---|---|
| $SiO_2$ | 35 to 60% |
| $Bi_2O_3$ | 5 to 45% |
| $Al_2O_3$ | 7 to 45% |
| $B_2O_3$ | 4 to 10% |
| at least one of | |
| CaO, MgO, SrO or BaO | 2 to 20% |
| at least one of | |
| $Li_2O$, $Na_2O$, $K_2O$ | 1 to 10% |
| $TiO_2$ | 0 to 10% |
| $ZrO_2$ | 0 to about 2.5% |
| SnO | 0 to 10% |
| $Nb_2O_5$ | 0 to 5% |
| $Ta_2O_5$ | 0 to 5% |
| $Sb_2O_3$ | 0 to 5% |
| a rare earth oxide | 0 to 10% |
| ZnO | 0 to 10% |
| $P_2O_5$ | 0 to 10% |
| $MoO_3$ and/or $WO_3$ | 0 to 5% |
| fluoride ions | 0 to 5% | all percentages being percentages by weight based on the total weight of the composition, with the proviso that BaO is not contained in an amount of more than 2% by weight, the glaze composition having a firing temperature of 1100° C.±40° C., and having a coefficient of thermal expansion of 50 to $90 \times 10^{-7}$ °C.$^{-1}$.

2. Glaze composition according to claim 1 which comprises from 10 to 25% by weight of $Bi_2O_3$.

3. Glaze composition according to claim 1 wherein the amount of $SiO_2$ is from 45 to 60% by weight.

4. Glaze composition according to claim 1 which fires at a temperature range of from 1060° to 1140° C. and which has a refractive index of at least 1.45.

5. Glaze composition according to claim 1 which additionally contains a pigment.

* * * * *